United States Patent
Snyder et al.

(10) Patent No.: US 9,977,501 B2
(45) Date of Patent: May 22, 2018

(54) VIDEO BUTTONS FOR A STAGE LIGHTING CONSOLE

(71) Applicant: Production Resource Group, LLC, New Windsor, NY (US)

(72) Inventors: Michael Snyder, Southlake, TX (US); James Bornhorst, Desoto, TX (US); Charles Reese, Grapevine, TX (US); Rusty Brutsche, Austin, TX (US)

(73) Assignee: Production Resource Group, LLC, New Windsor, NY (US)

( * ) Notice: Subject to any disclaimer, the term of this patent is extended or adjusted under 35 U.S.C. 154(b) by 53 days.

(21) Appl. No.: 15/156,929

(22) Filed: May 17, 2016

(65) Prior Publication Data

US 2016/0342210 A1 Nov. 24, 2016

Related U.S. Application Data

(63) Continuation of application No. 11/777,028, filed on Jul. 12, 2007, now Pat. No. 9,342,157.

(60) Provisional application No. 60/830,490, filed on Jul. 12, 2006.

(51) Int. Cl.
| | |
|---|---|
| G09G 1/00 | (2006.01) |
| G06F 3/01 | (2006.01) |
| G06F 3/023 | (2006.01) |
| G06F 3/02 | (2006.01) |
| G06F 3/0362 | (2013.01) |
| G06F 3/041 | (2006.01) |
| H05B 37/02 | (2006.01) |

(52) U.S. Cl.
CPC ............ *G06F 3/016* (2013.01); *G06F 3/0219* (2013.01); *G06F 3/0238* (2013.01); *G06F 3/0362* (2013.01); *G06F 3/0416* (2013.01); *H05B 37/0209* (2013.01)

(58) Field of Classification Search
CPC ......... G09G 5/00; G06F 3/013; G06F 3/0482; G06F 3/041; G06F 3/01; G06F 3/044
See application file for complete search history.

(56) References Cited

U.S. PATENT DOCUMENTS

| | | | |
|---|---|---|---|
| 4,551,717 A | 11/1985 | Dreher | |
| 5,712,661 A | 1/1998 | Jaeger | |
| 5,769,527 A | 6/1998 | Taylor et al. | |
| 6,492,978 B1 | 12/2002 | Selig et al. | |
| 6,636,203 B1 | 10/2003 | Wong et al. | |
| 6,992,659 B2 | 1/2006 | Gettemy | |
| 7,139,617 B1 | 11/2006 | Morgan et al. | |
| 2003/0128191 A1* | 7/2003 | Strasser | G06F 3/016 345/173 |
| 2006/0158461 A1 | 7/2006 | Reese et al. | |

(Continued)

*Primary Examiner* — Michael Faragalla
(74) *Attorney, Agent, or Firm* — Law Office of Scott C Harris, Inc

(57) ABSTRACT

Video buttons controlling stage lights. Each of the buttons includes a video part, which displays either video or an image that previews the function that is carried out by the button when it is pressed. The buttons can be full-color buttons that show full color videos. An array of buttons can be grouped together, so that the array can operate in different modes, one of which in which the array shows an overall display, and another of which in which the array shows a single function per button. Different technologies including analog switches, touch screens, and the like can be used.

12 Claims, 5 Drawing Sheets

(56) References Cited

U.S. PATENT DOCUMENTS

| | | |
|---|---|---|
| 2006/0163945 A1 | 7/2006 | Bomhorst et al. |
| 2006/0181517 A1* | 8/2006 | Zadesky ............... G06F 1/1613 |
| | | 345/173 |
| 2006/0221059 A1 | 10/2006 | Choi et al. |
| 2007/0147054 A1 | 6/2007 | Bomhorst |

* cited by examiner

VIDEO BUTTONS FOR A STAGE LIGHTING CONSOLE

CROSS-REFERENCE TO RELATED APPLICATIONS

This application claims priority to U.S. Provisional Application 60/830,490, filed Jul. 12, 2006.

BACKGROUND

Stage lighting consoles, such as the Virtuoso® series of consoles, allow control of a number of different parameters on stage lights and other controllable devices. These remote lights may all be located at different locations. For example, the Virtuoso® console may allow control of 2000 multiple parameter luminaires via the DMX 512 control format, and control between 2000 and 10,000 cues per fixture, with multiple presets, effects, beam selects, macros, and snapshots, as well as other effects.

FIG. 1 illustrates an exemplary console 100. The console includes many different controlling buttons, shown as 110. Since multiple parameters and multiple luminaires may be controlled by these buttons, these buttons may be dynamically assigned to different parameters. The parameters controlled by the dynamically-assigned buttons should be viewable in some way.

The console may include the main button area 110, auxiliary areas such as 120, and other areas.

Control of digital lights and other digitally and/or electronically controllable lights may control various effects on the digital lights, including for example video, color, shape, and the like. The complex control of the digital lights allows control of many different functions.

Touch screens are known, in which different areas of the touch screen can be used for different functions. However, touch screens typically provide no tactile response to a user. The so-called "feel" of a control board may be extremely important. While a designer or operator is looking at the stage, they want to be able to control by feel. Such is not possible in a conventional touch screen.

SUMMARY

The present application describes the use of buttons which can display information about the control which is currently assigned to the buttons.

Embodiments describe buttons that may display pictures, video and the like.

BRIEF DESCRIPTION OF THE DRAWINGS

These and other aspects will now be described in detail with reference the accompanying drawings, wherein.

DETAILED DESCRIPTION

The general structure and techniques, and more specific embodiments which can be used to effect different ways of carrying out the more general goals, are described herein.

Figure 1:
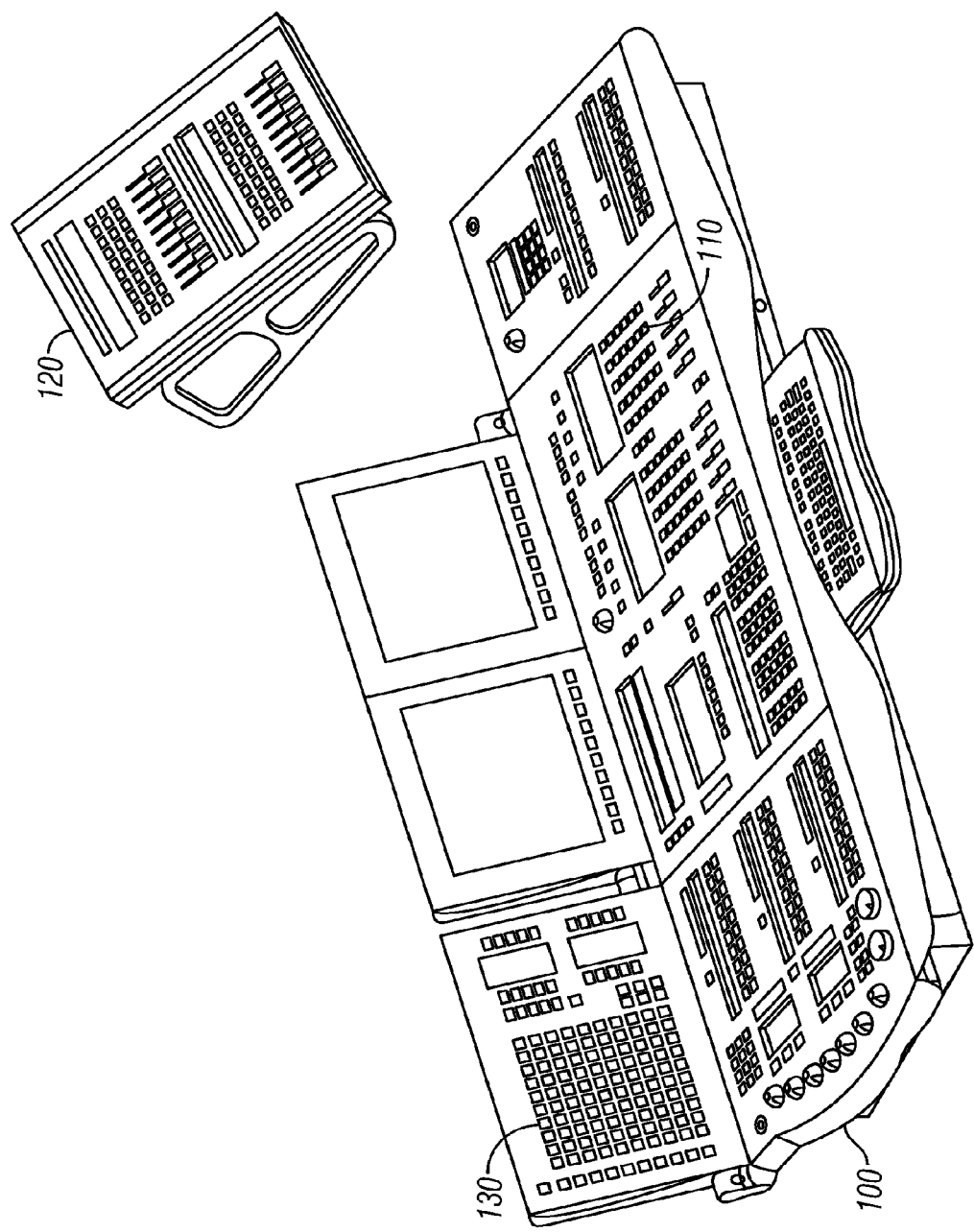
FIG. 1 shows an exemplary console layout.

A first embodiment uses a solid-state display element in conjunction with any or all of a plurality of selectable buttons, such as any of the buttons in areas 110, 120 or 130, in the console of FIG. 1.

Figure 2:
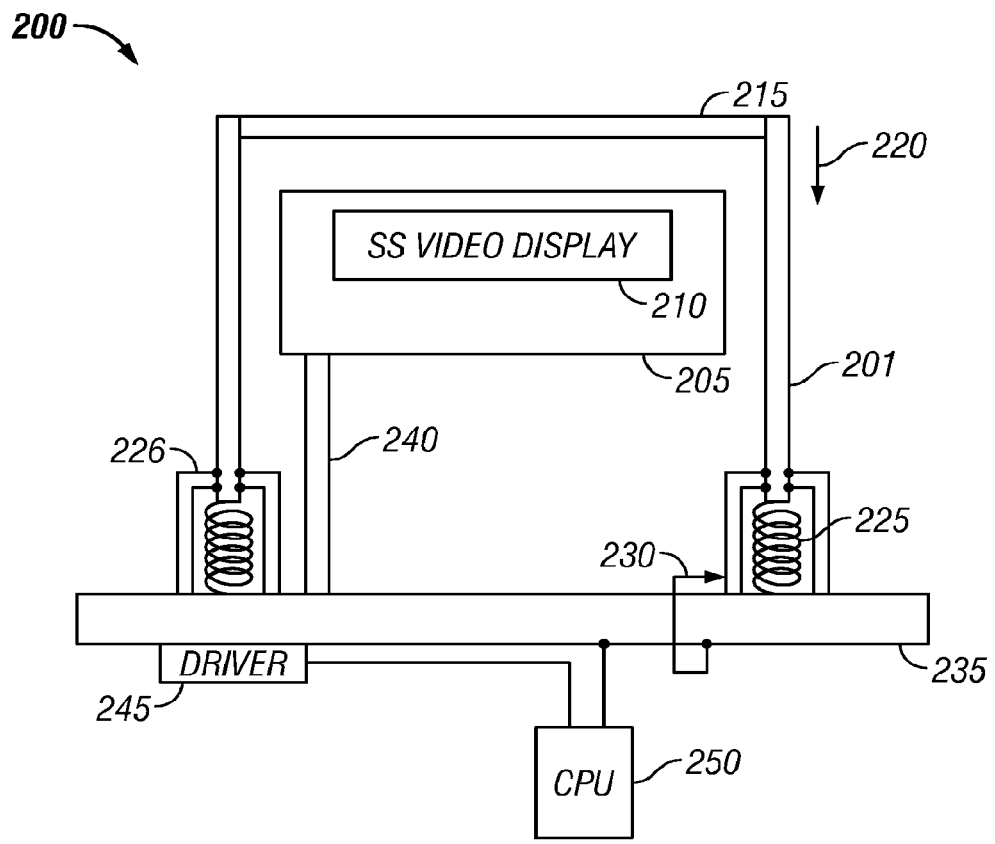
FIG. 2 shows an embodiment with a solid-state video display mounted inside a button, where the display can show the function of the button.

A first embodiment is shown in FIG. 2. Each module 200 forms one switch of an array of switches such as 110. The module includes a switch housing 201, surrounding a video module 205 which includes a video display element 210. The video display element 210 can be a liquid crystal, light emitting diode, LCOS type device, or any other solid-state device which allows full color and full-motion display. The video display is located under a clear plastic window 215 that forms a top part of the housing. The plastic window 215 is movable as shown by the arrow 220.

A spring assembly 225 maintains the housing 201, and the clear plastic window 215 in the up position. However, when the window 215 is depressed, it can be depressed against the force of the spring bias, into the downward position. A switch assembly 230 is placed in a location to be actuated by the movement of housing 201, to cause an actuation.

A circuit board 235 may be associated with the switch. The actuation is sensed by circuit board 235. The video element 205 is also connected via a connection 240 to the circuit board 235. The circuit board can be a convenient package for holding these elements. Alternatively, however, the elements may be attached directly to the housing 201, or packaged in some other way.

Also, mechanical elements shown as guide elements 226 hold or guide the walls forming the switch element into place. The guide elements 226 guide the housing 201 in its movements between the up and down positions. The housing 201 is typically normally spring biased in the up position, and pressed into the down position in order to actuate the switch assembly 230. The actuation causes an indication of the actuation via the switch 230, to the circuit board.

A video driver 245 is connected via a connection 240 to the video display 210, and allows displaying video information indicative of the current operation and/or function of the switch.

The switch may be configured to control a specific function by operation of a remote controller, shown generically as CPU 250. The CPU may operate according to a stored program to dynamically assign different switches to different functions. The CPU provides information to the switch 200 about the different image or other information that the switch will control.

For example, if the switch 200 is configured to currently control a lamp to display a "cloud" type environment, then clouds may be displayed on the display 210. The CPU 250, which may be a media server, or any other kind of processing element, controls the driver 245 to make the appropriate display. CPU 250 is also connected to the circuit board 235. CPU 250 receives an indication of switch actuation from the circuit board.

The CPU and driver can control full color graphic video display 210, and can control the display 210 to display, for example, video, gobos, colors, text, graphical signals, or thumbnail clips of video or short displays of video. These displayed items that are displayed on the video display 210 can be provided by the CPU 250, especially when the CPU is or is connected to a media server.

Figure 3:
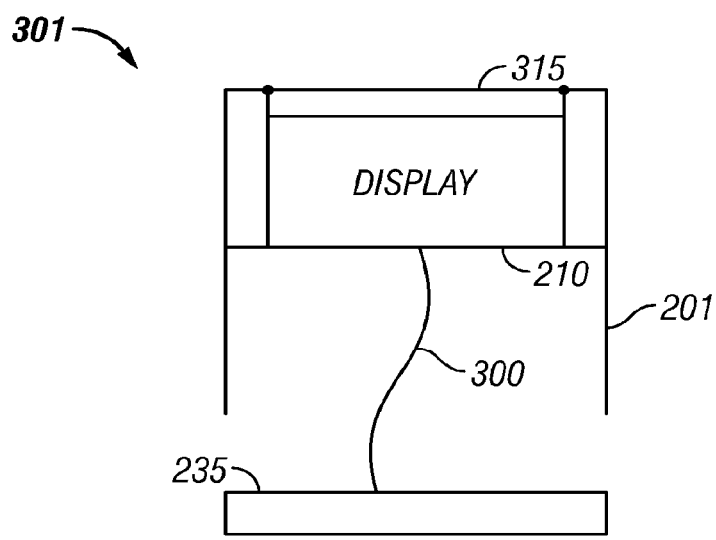
FIG. 3 illustrates an embodiment where the display moves as the button is actuated.

The switch may take a number of different forms. FIG. 3 illustrates a first form, which may avoid or reduce a parallax error. In FIG. 2, the housing moves independently of the display, and hence the distance between the display 210 and the window 215 varies during pressing. In this embodiment, the display 210 is rigidly coupled to the housing 201. The housing 201 moves up and down as a whole with the display 210 attached thereto. Hence, the distance between the display 210, and the window 315 through which the display is viewed, is always substantially the same.

A flexible cable, e.g., a ribbon cable 300 forms the connection between the display and the circuit board 235. Although this describes a circuit board 235, it should be understood that any kind of connection could be used in place of the circuit board.

The display 210 moves with the button 301, and therefore the display always has the same spatial relationship with the housing. This avoids parallax.

Figure 4:
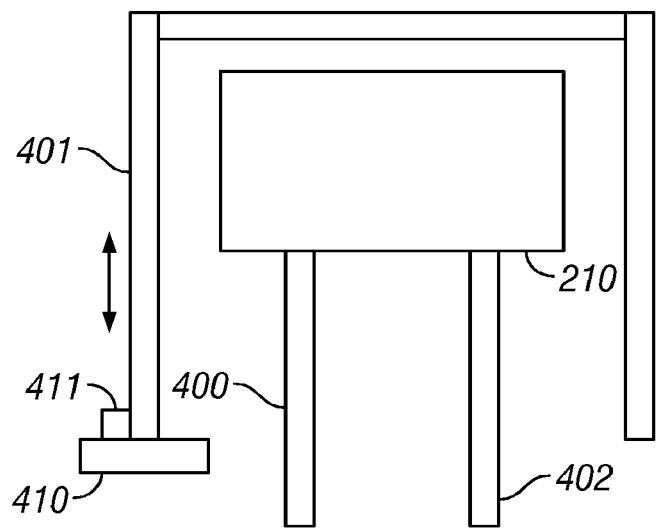
FIG. 4 illustrates an embodiment where the display is fixed in position on the button mode.

In an alternative embodiment, shown in FIG. 4, the display 210 remains fixed in place e.g. by a pair of standoffs 400, 402 which may include connections therein. The housing 401 moves up and down. A switch 410 is connected to a portion of the housing via a spring bias connection. The housing 401 is usually spring biased into the upward position, and can be pressed down against the force of the spring 411, to actuate the switch 410. In this way, the movement of the housing 401 causes an actuation. This may be a simpler connection technique, but may cause some parallax during its operation.

An alternative embodiment may move only the window 215, without moving the rest of the walls of housing 201. other alternatives may allow moving the housing in other directions other than downward; for example a housing may be moved up to actuate or maybe move side to side to actuate.

In all of these above embodiments, since the switch device 230 is used, the tactile feel of the switch can be obtained when the housing is moved to actuate it.

Figure 5A:
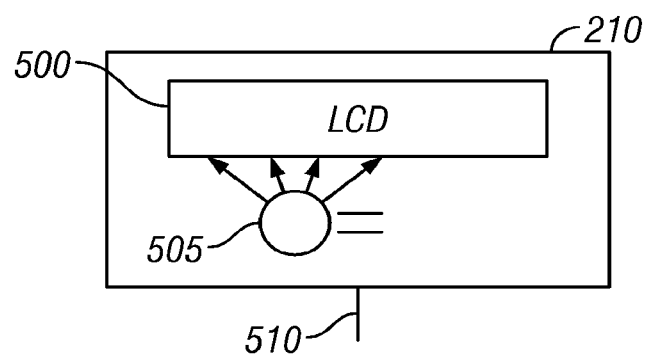
FIGS. 5A and 5B show respectively nonemissive and emissive display systems used in this button embodiment.
Figure 5B:
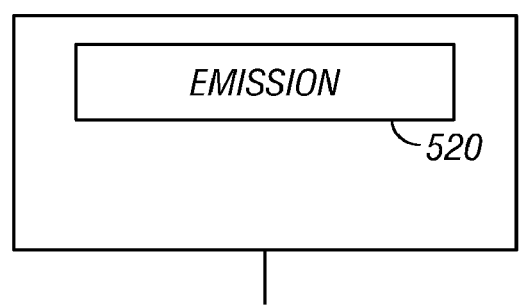

FIGS. 5a and 5b illustrate the two alternative embodiments for producing the display. These embodiments can be used with any of the embodiments of FIGS. 2-4.

In a first embodiment, the display assembly 210 is formed of a transmissive device 500, such as a liquid crystal device. A light source 505, such as a white LED, produces light that illuminates the liquid crystal. Of course, multiple LEDs, such as an array of LEDs, may be used, or alternative light sources can be used. The light source can be powered by the same power line that produces the drive to the liquid crystal 500.

In a second embodiment, shown in FIG. 5b, an emissive device is used as display 520, such as an emissive LED, or other electronically emissive device.

Figure 6:
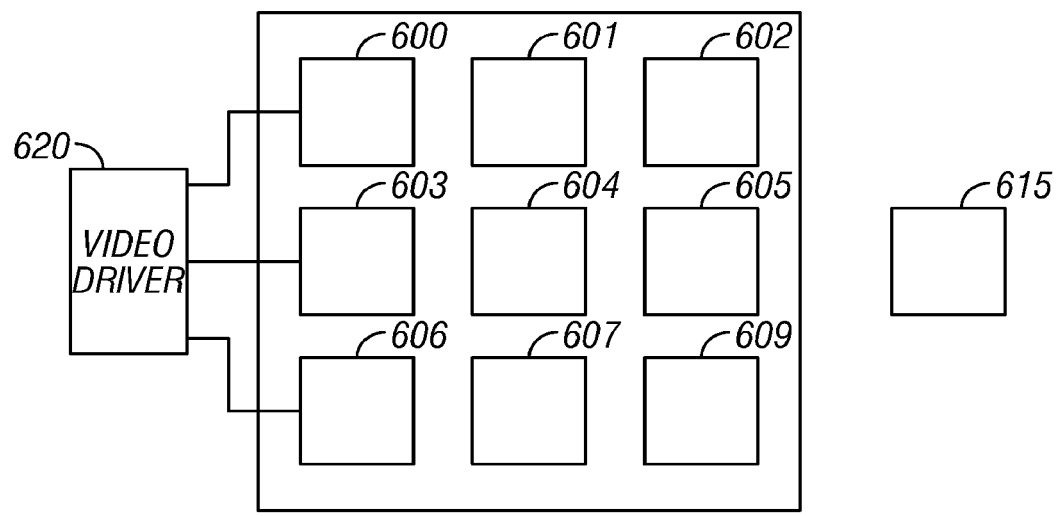
FIG. 6 shows an embodiment using multiple different buttons in an array.

As shown in FIG. 1, buttons may be arranged in a two-dimensional rectangular array. According to an embodiment, each of the buttons of the array show what they are going to represent. Another embodiment, shown in FIG. 6, may have certain advantages. In this other embodiment, an array of buttons, such as 600, are arranged together. A separate actuator 615, which may be a button or some other actuator, commands a preview mode. When the preview mode is actuated, the buttons 600 through 609 collectively form a video wall-type device, where each button forms one pixel of an overall display. In this embodiment, there is preferably less distance between the buttons, for example the ratio of area between the buttons and area of the buttons may be 20% or less; more preferably 10% or less.

Upon actuating the preview mode button 615, a larger display is formed among all the buttons 600 through 609. When not in preview mode, each button can individually show what it is going to represent. Each of those representations can represent a function of any of the buttons, or a function of the entire group of the buttons.

An advantage of this embodiment, at least in one form, is that a single video driver 620 may be used for all the buttons 609. In an embodiment where each button must produce its own display, it may be required that each button includes its own display driver.

Another embodiment may avoid the use of multiple drivers. This system uses a single display part shown as 702 displaying multiple different sub images shown as 702, 704. Each sub image is associated with an actuator, shown as 710, which is co-located with the image. However, since a single screen 702 displays an entire image, only one video driver 725 is necessary.

Figure 7A:
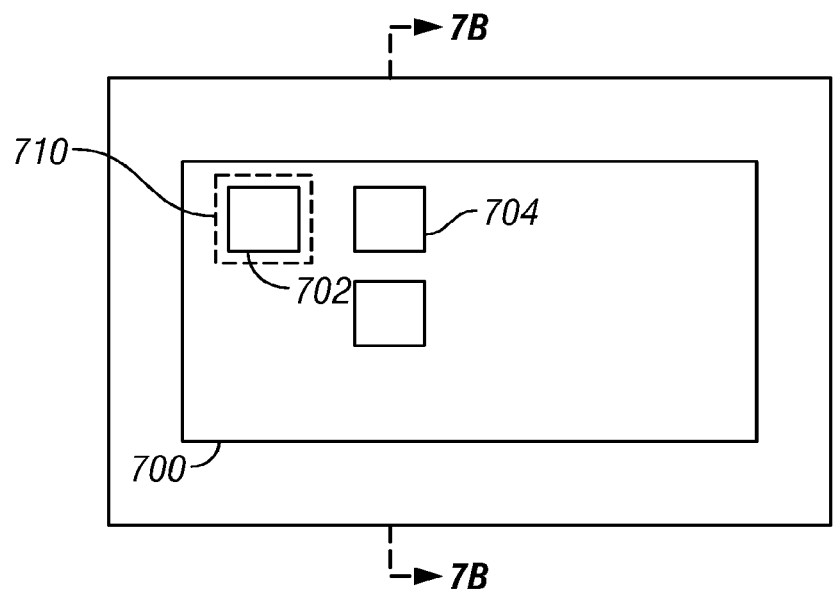
FIGS. 7A and 7B illustrates an embodiment where the single display forms the video for multiple buttons.
Figure 7B:
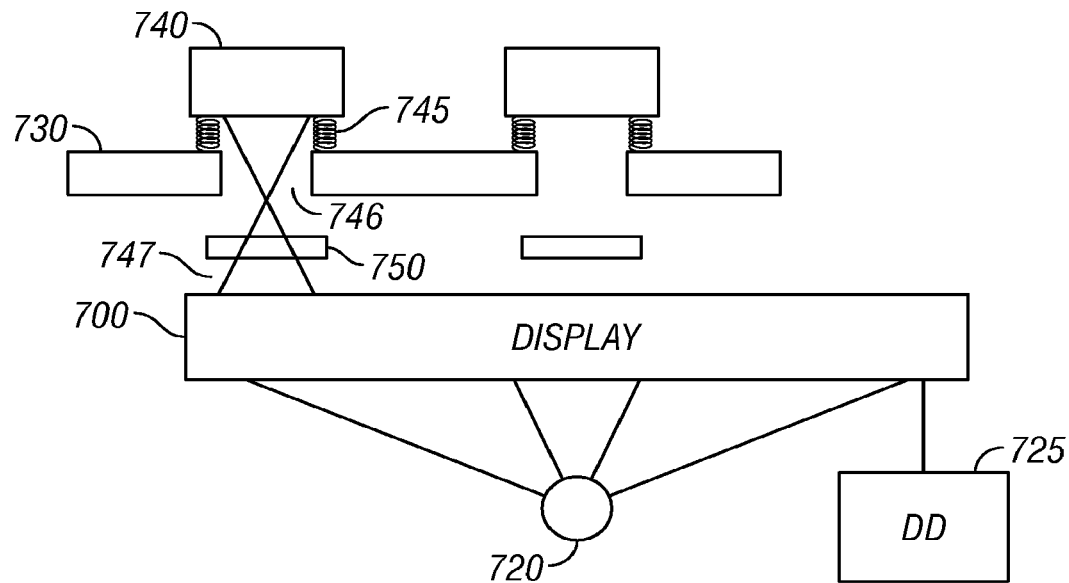

FIG. 7b illustrates a cross-section along the line 7B-7B in FIG. 7a. The screen, 700, which may be a liquid crystal screen or a touch screen, forms the bottommost portion. An illumination part 720 may illuminate the screen 700 if it is not emissive. The display 700 is driven by a single display driver shown as 725, which in turn receives information from a processor. A connection part, for example a PC board 730, is located over the display 700. PC board 730 includes different connections, for a movable spring device. The actuation device 740 is spring-loaded using springs and a tactile response mechanism 745, relative to the PC boards 730. A hole 746 in the PC board allows the light from the display shown as 747 to reach through the button portion 740. The buttons 740 may be, for example, transparent, so that the light and portions of the screen, may be seen therethrough.

Alternatively, the actuation portion 745 may include some kind of lensing system therein, for example, a magnifying lens. Hence, the actuation part 740 forms both the display and the button. The spring 745 forms both the spring, contact and tactile mechanism. A lensing system 750 is optionally provided between the display 700 and the actuator 740, in order to maintain or focus the image from the display on the proper portion of the actuation surface of the button 740.

Figure 7C:
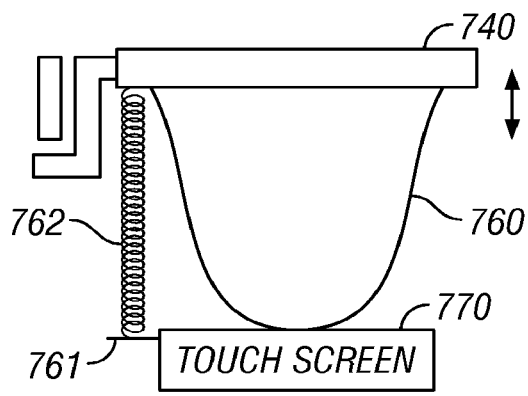
FIG. 7C illustrates an embodiment using a touchscreen for a video button.

An alternative system may operate as shown in FIG. 7c, which allows using a touch screen for the operation. Actuation mechanism is connected to an actuator part 760 which includes a bottom surface 761 adapted to touch the touch screen 770 which displays the display. The actuator part 760 allows the light from the touch screen 770 to pass therethrough. A first embodiment may use a transparent actuator 760. A second embodiment includes a hole therethrough, through which the image of the touch screen can be seen either directly or through a lensing system.

The actuation device 760 may be spring-loaded using a spring 762.

In any of the embodiments disclosed above, the video buttons can each be used for controlling any function of any of a plurality of remotely located stage lights. For example, a button can be used for fading, cross-fading, assigning an image or gobo to a light, assigning a color to a light, or any other function conventionally carried out by stage lighting systems. However, this control can also be used for other kinds of controlling.

The above has described a snap action element, however it should be understood that any tactile element such as a dome or clicking element can be used.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, different display techniques, types and drivers may be used.

The computers described herein may be any kind of computer, either general purpose, or some specific purpose computer such as a workstation. The computer may be a Pentium class computer, running Windows XP or Linux, or may be a Macintosh computer. The programs may be written in C, or Java, or any other programming language. The programs may be resident on a storage medium, e.g., magnetic or optical, e.g. the computer hard drive, a removable disk or other removable medium. The programs may also be run over a network, for example, with a server or other machine sending signals to the local machine, which allows the local machine to carry out the operations described herein.

Also, the inventors intend that only those claims which use the words "means for" are intended to be interpreted under 35 USC 112, sixth paragraph. Moreover, no limitations from the specification are intended to be read into any claims, unless those limitations are expressly included in the claims.

The invention claimed is:

1. An actuatable switch assembly, comprising:
   a board;
   an actuatable switch with a transparent control and a tactile response device, said actuable switch connected on the board,
   said actuatable switch includes a spring biasing the control in a first direction, and a switch that creates an electrical contact and provides a tactile clicking feel when the control is moved in a direction opposing the spring bias;
   a display, separated from the board, and separated from the switch and on a different plane than the board and switch, said display connected to receive electronic information associated with a function of the switch, and to display said information,
   said display viewable through said transparent control,
   and where said control is moved to control said function, and when moved creates said tactile clicking feel,
   wherein the display is fixed, and the control is movable relative to the display,
   wherein the display is below the board, and the board includes a hole therein through which the display is viewable the control and through the hole in the board, and
   wherein there are a plurality of said switch assemblies, located in an array relative to one another, and all of said switch assemblies located over a common display, and all of said switch assemblies having parts that are viewable through their respective control parts from the common display.

2. The switch assembly as in claim 1, wherein the control is movable on parallel rails, and the board has guides that hold said parallel rails to allow the control to move up and down relative to the board.

3. The switch assembly as in claim 2, wherein the rails are spring biased into their upper position, and are pressed into their downward most position to actuate said switch.

4. The switch assembly as in claim 1, wherein the control part is lowered towards the board in order to actuate the switch.

5. The switch assembly as in claim 1, wherein the tactile response device is a snap action element.

6. The switch assembly as in claim 1, where all of the switch elements collectively view a common scene, with only parts of the scene seen through the actuator control and through the hole in the board, and where the viewing includes blank spaces in the scene between said actuator controls and between the holes in the board.

7. An actuatable switch assembly array, comprising:
   a display;
   a board, located over the display, with a plurality of holes in the board, through which the display is viewable;
   a plurality of switch assemblies, connected to the board, each switch assembly including an actuatable switch with a transparent control and a tactile response device, each switch assembly coupled to the board at a location of a hole in the board,
   each switch assembly including a spring biasing the transparent control in a first direction, and a switch that creates an electrical contact and provides a tactile clicking feel when the control is moved in a direction opposing the spring bias;
   said display being on a different plane than the board and switch,
   said display connected to receive electronic information associated with a function of the switch,
   said display viewable through said transparent control,
   and where said control is moved to control said function, and when moved creates said tactile clicking feel.

8. The array as in claim 7, wherein each control is movable on parallel rails, and the board has guides that hold said parallel rails to allow the control to move up and down relative to the board.

9. The array as in claim 8, wherein the rails are spring biased into their uppermost position.

10. The array as in claim 7, wherein the display is fixed, and the controls are each movable toward the display in order to actuate the switch.

11. The array as in claim 7, wherein the tactile response device is a snap action element.

12. The array as in claim 7, where all of the switch elements collectively view a common scene, with only parts of the scene seen through the actuator control and the holes in the board, and where the viewing includes blank spaces in the scene between said actuator controls and the holes in the board.

* * * * *